Oct. 25, 1966  F. J. GOEBELS, JR  3,281,851
DUAL MODE SLOT ANTENNA
Filed May 24, 1963  3 Sheets-Sheet 1
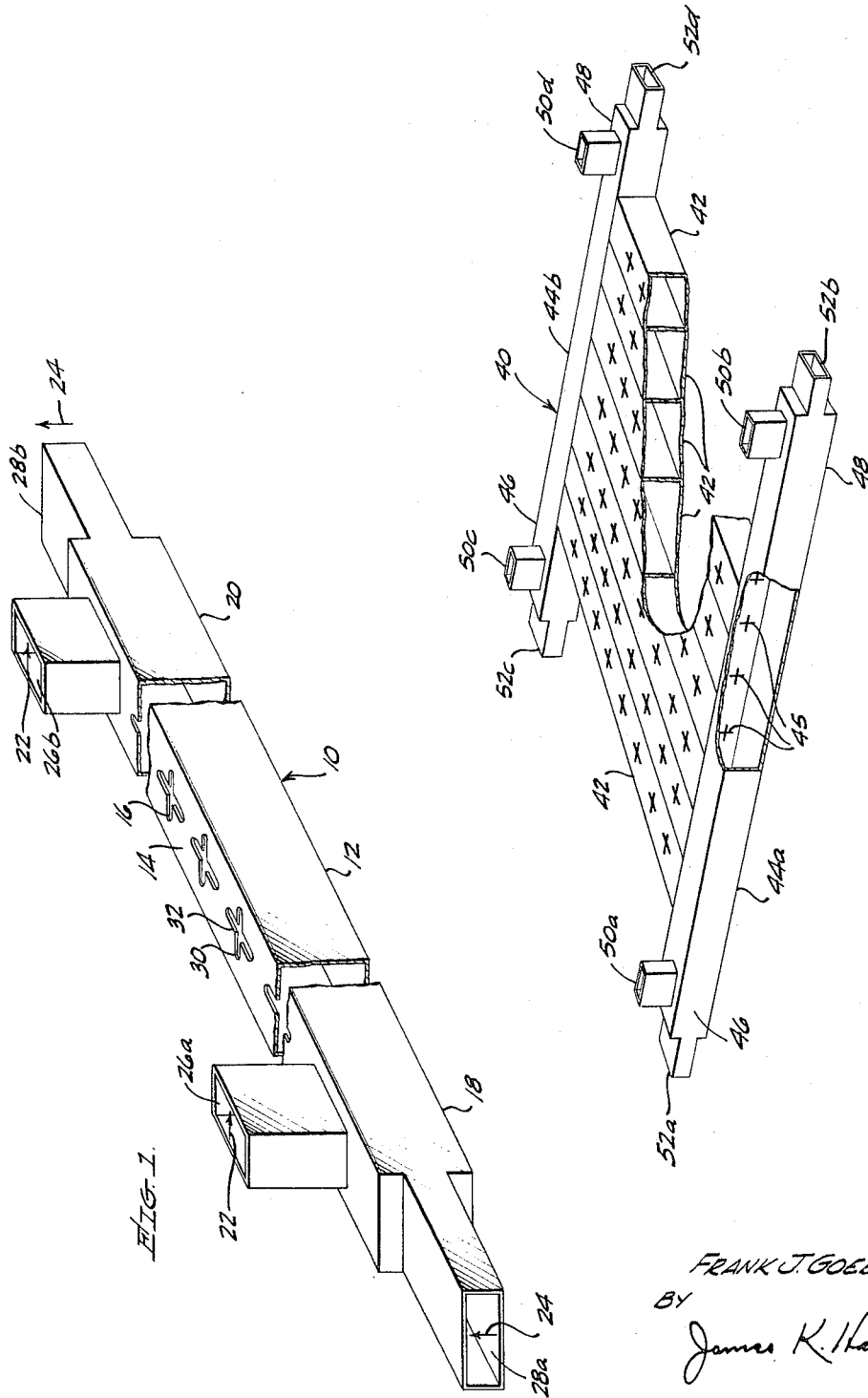
INVENTOR
FRANK J. GOEBELS JR.,
BY
James K. Haskell
ATTORNEY.

Oct. 25, 1966  F. J. GOEBELS, JR  3,281,851
DUAL MODE SLOT ANTENNA

Filed May 24, 1963  3 Sheets-Sheet 2

INVENTOR.
FRANK J. GOEBELS JR.,
BY
James K. Haskell
ATTORNEY.

Oct. 25, 1966   F. J. GOEBELS, JR   3,281,851
DUAL MODE SLOT ANTENNA
Filed May 24, 1963
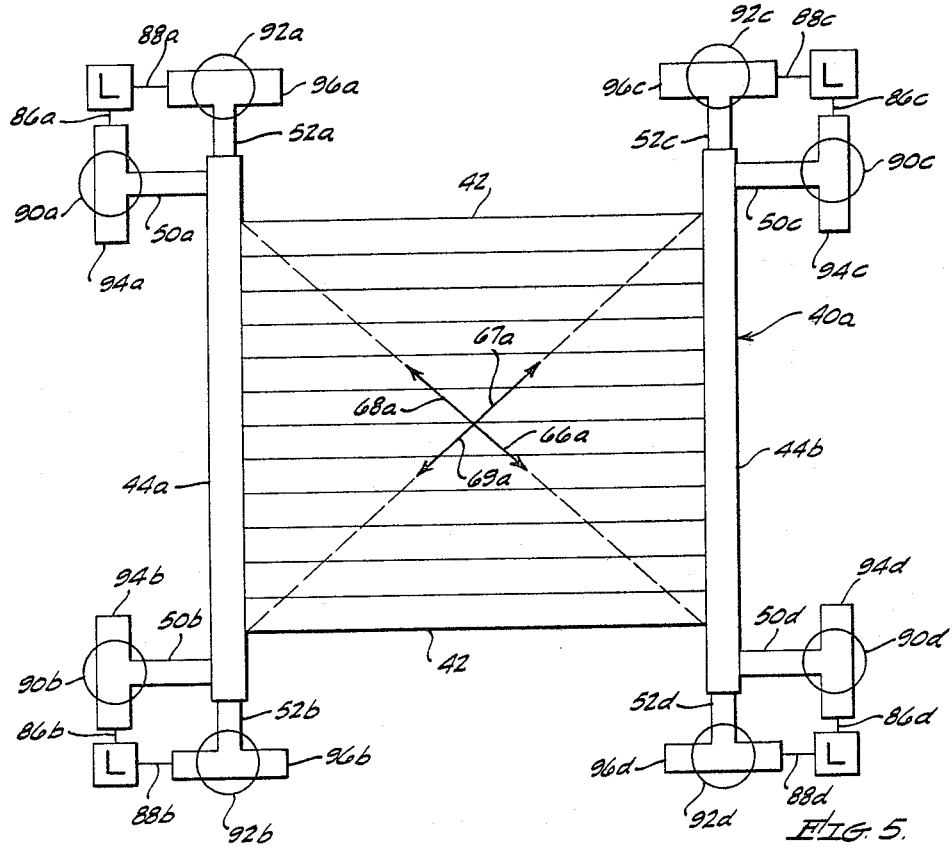
FIG. 5.
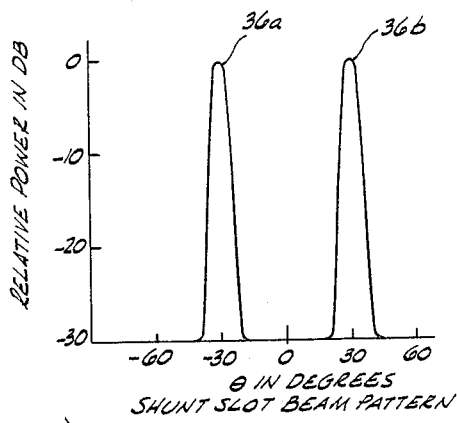
FIG. 6.
SHUNT SLOT BEAM PATTERN
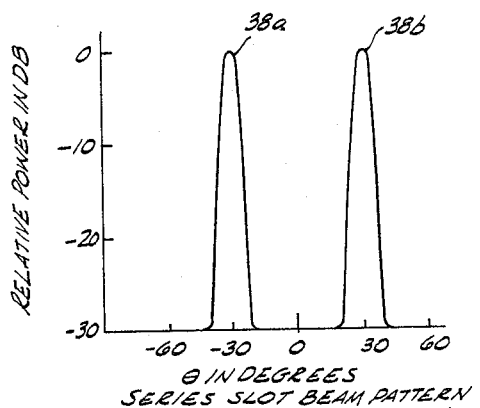
SERIES SLOT BEAM PATTERN
INVENTOR.
FRANK J. GOEBELS JR.
BY
James K. Haskell
ATTORNEY.

United States Patent Office 3,281,851
Patented Oct. 25, 1966

3,281,851
DUAL MODE SLOT ANTENNA
Frank J. Goebels, Jr., Los Angeles, Calif., assignor to Hughes Aircraft Company, Culver City, Calif., a corporation of Delaware
Filed May 24, 1963, Ser. No. 282,948
17 Claims. (Cl. 343—768)

This invention relates generally to antennas and more particularly to a slot antenna capable of producing simultaneous independent beams in space.

The functional requirements of many present day radar and communication systems may best be realized by utilizing multiple-beam antennas. One such system, for example, is a Doppler navigation system in which the all important velocity vector of an aerospace vehicle is determined and monitored from the return of signals radiated by the system in predetermined directions in space at known instants in time. Thus, the ground speed of such a vehicle may be obtained by utilizing two beams, one directed forwardly and the other rearwardly relative to the vehicle's direction of motion. By using four beams—namely, two fore and two aft, each at a finite angle from the direction of motion—the drift angle as well as the ground speed may be extracted from the return signal.

Various prior art antenna configurations could be used to generate the required two or four beams in the Doppler navigation system but not without certain significant disadvantages each obviated by the dual mode slot array of the present invention. For instance, several single-beam antennas could be used or, in another example, one or more dual beam antennas with sequential switching could be used to produce the required number of beams. In either event, both prior techniques result in increased antenna weight and volume as well as a subsequent loss in information rate and a lower relative antenna gain as compared to a system employing an antenna as set forth herein.

Briefly, the present invention provides a single linear array that is capable of simultaneously transmitting or receiving independent signals through independent beams in space. The antenna array consists of a square waveguide transmission line, an aperture composed of two electrically-independent groups of linear slots and an appropriate number of orthogonal mode transducer ports located at the input-output terminals of the array. The antenna is dual mode operated and the aperture of the array is travelling-wave excited with the signal emanating from each port giving rise to a single independent beam in space whose pointing direction is off broadside. Internal signal or port isolation is obtained by appropriately utilizing the mode isolation that exists between the dominant $TE_{01}$ and $TE_{10}$ square waveguide modes. This mode isolation is maintained along the aperture length by utilizing two independent slot groups, each coupling to only one waveguide mode. Beam isolation is obtained by suitable reduction of the sidelobes in the direction of the remaining beams.

Several such linear arrays may be arranged according to the invention to form the aperture of a four port, two dimensional planar array capable of producing four simultaneous independent beams. For this, an even coupling function is required for each group of linear slots. In prior arrays, an uneven coupling function was typically employed to provide the desired even power distribution function across the aperture. Here, however, an uneven power distribution function is desired because the beams then generated by each linear slot group may be made image beams of each other regardless of the direction of propagation of the dominant $TE_{01}$ and $TE_{10}$ modes.

With this invention, two simultaneous independent beams may be generated from a single linear array and four such beams from a two-dimensional planar array. With sequential switching, an additional set of these beams can be generated. Irrespectve of the arrangement chosen, beam scanning may be achieved through suitable provisions for frequency modulation. And finally, each set of beams may selectively have the same or different beam pointing directions and if the same may in addition be arbitrarily polarized. Antennas having such unique features are particularly suitable, to name a few, in the field of counter measure devices where the acquisition and jamming of several hostile radar systems may be required and in the navigational field to determine and monitor the velocity vector of an aerospace vehicle more rapidly and more accurately as well as to provide selective space or ground communication or search.

Accordingly, it is an object of the present invention to provide an improved multiple beam antenna.

It is another object of the invention to provide a linear slot array capable of producing mirror image beams in space.

It is still another object of the invention to provide an antenna capable of producing simultaneous independent beams from a single dual mode array.

It is a further object of the invention to provide a travelling-wave excited slot array capable of generating multiple arbitrarily polarized beams.

Another object of the invention is to provide a travelling-wave excited linear array capable of dual mode operation for generating two sets of independent beams, each set having a desired beam pointing direction from the broadside.

It is still a further object of the invention to provide a travelling-wave excited two dimensional array comprising two groups of electrically independent slots from which four independent beams are generated each at a predetermined angle from the aperture broadside.

It is another object of the invention to provide a travelling-wave excited two-dimensional slot array capable of generating two sets of four simultaneous independent beams in space.

It is a further object of the invention to provide a dual mode slot antenna capable of producing multiple beams at a predetermined angle from the broadside of the antenna aperture and about which angle the beam pointing direction may be varied by frequency modulation.

In accordance with these and other features and objects of the invention, there is provided a dual mode slot antenna for producing multiple beams in space comprising, in combination, a square waveguide capable of supporting the propagation of microwave energy in the dominant $TE_{01}$ and $TE_{10}$ modes, the square waveguide embracing in a wall thereof a linear array of non-resonant spaced apart shunt and series slots operatively responsive to the $TE_{01}$ and $TE_{10}$ modes respectively; orthogonal mode transducer means coupled to the square waveguide at the ends thereof and including first and second ports for passing only the dominant $TE_{01}$ and $TE_{10}$ modes respectively; terminal means including a microwave device coupled to the antenna for exciting the dominant modes simultaneously from opposite ends of the square waveguide to form two independent beams angularly disposed from the broadside of the wall by an angle $\theta$; and load means coupled to each of the transducer means at different ones of the ports for absorbing substantially all of the microwave energy incident thereat other than that passing through the remaining ports. As used herein, the term "square waveguide" is understood to include waveguides, which, although not of exactly square cross section, nevertheless are capable of supporting propagating electromagnetic wave energy in both the $TE_{01}$ and $TE_{10}$ modes over the frequency range of operation.

The following specifications and the accompanying drawings describe and illustrate preferred embodiments of the present invention, like reference characters being used to designate like parts throughout the drawings, wherein:

FIGURE 1 is a perspective view of a linear array capable of producing two independent beams in space and comprises a first embodiment of the present invention;

FIG. 2 is a perspective view of a second embodiment of the invention capable of producing four simultaneous independent beams in space;

FIG. 5 is a schematic diagram of another embodiment of the invention comprising a two-dimensional array capable of producing two sets of four simultaneous independent beams in space; and FIG. 6 is a graph showing typical beam pattern of the energy radiated by the linear array of FIG. 1 which was operated at X-band.

Figure 3:
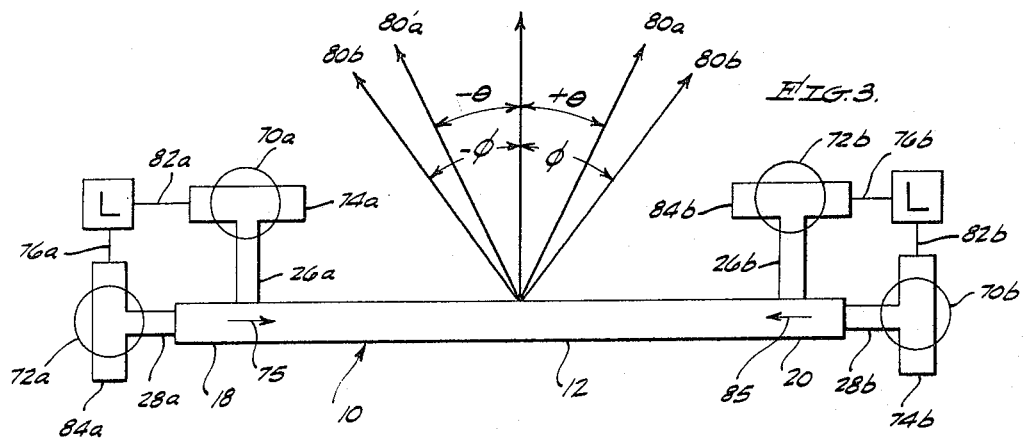
FIG. 3 shows in diagrammatic form a third embodiment which is capable of producing two arbitrarily polarized beams or four independent beams in space.

In FIG. 1, a first embodiment of a dual-mode linear array 10 of the present invention is shown comprising a square waveguide transmission line 12, an aperture 14 composed of two electrically-independent groups of linear slots as for example, the crossed slots 16, and two orthogonal mode transducers 18, 20 located at the input-output terminals of the array 10.

The square waveguide 12 is capable of supporting the propagation of electromagnetic waves in the dominant $TE_{01}$ and $TE_{10}$ modes 22, 24 respectively.

Mode transducers 18 and 20 each include two orthogonal ports 26a, 28a and 26b, 28b, respectively. Ports 26a and 26b serve to pass wave energy corresponding to the $TE_{01}$ mode 22 in waveguide 12 while rejecting wave energy propagated in the $TE_{10}$ mode 24 in waveguide 12. Ports 28a and 28b, on the other hand, serve to pass wave energy propagated within waveguide 12 in the $TE_{10}$ mode 24 while rejecting wave energy propagated within waveguide 12 in the $TE_{01}$ mode 22. Standard rectangular waveguide stock joined in a conventional manner to the waveguide 12 may be used for the ports 26 and 28. With this arrangement, the mode isolation that exists between the dominant $TE_{01}$ and $TE_{10}$ square waveguide modes is fully utilized to provide suitable internal signal or port isolation. In other words, signals emanating from the ports 26 and 28 are mode isolated while traversing the square waveguide 12.

To maintain this mode isolation along the length of the aperture 14, two independent slot groups are used, each coupling to only one of the two orthogonal waveguide modes 22 and 24. One configuration that satisfies this requirement is that of the crossed slots 16; however, other slot configurations which may meet this requirement can also be used.

The crossed slot configuration results from superimposing a first group of pure series slots 30 over a second group of pure shunt slots 32 which are positioned along the centerline in the aperture wall of the waveguide 12. For each slot group, slot coupling control is achieved by varying the non-resonant length of both the series slots 30 and the shunt slots 32. In this way the pattern of the beam generated by each slot group can be individually shaped as desired; in fact, the beams generated by one or both slot groups may be mirror images of each other. With other slot group configurations, different types of slot coupling may be required and used; however, with the crossed slots 16 where their relative position in the aperture 14 is fixed by the signal isolation requirement, the preferred method of slot coupling is that of varying the non-resonant length of the slots of each group. The result desired in any event is for the $TE_{01}$ mode 22 to simultaneously excite only the shunt slots 32 and the $TE_{10}$ mode 24 only the series slots 30 without appreciable sidelobe levels degrading beam isolation.

In a linear array constructed according to the invention for X-band operation at a frequency of 8.25 kmc., reference FIG. 1, the inter-element spacing of the slots was $0.44\lambda_0$ where $\lambda_0$ is the free space wavelength of the energy radiated. The aperture of this linear array, hereafter referred to as the test array, is in fact a composite of two linear slot apertures each composed of 61 slots properly superimposed in the form of the crossed slots 16 of FIG. 1. Each slot group was designed to generate substantially identical zero order pencil beams with sidelobes well below —20 db.

A commercially available microwave signal generator was then coupled at each end of the test array at ports corresponding to the ports 26b and 28a of FIG. 1, and the test array thereafter excited in the dominant $TE_{01}$ and $TE_{10}$ modes 22 and 24. At the remaining ports 26a and 28b separate flat loads were coupled to absorb all energy other than that radiated by the slot groups 30 and 32. When so connected and operated, the linear slot groups are excited each from opposite ends of the test array and produced two beams 36a and 38b as seen in FIG. 6, each substantially mirror images of one another. The beams 38a and 36b of FIG. 6 are likewise image beams that can be generated by the test array by feeding it the $TE_{01}$ and $TE_{10}$ modes respectively at the ports 26a and 28b where previously the flat loads now coupled to the ports 26b and 28a were then connected.

The beams 36a and 36b as well as the beams 38a and 38b, by employing an even coupling function in the test array, are also mirror image beams of each other. Such an even coupling function may be realized by making the non-resonant solt length substantially the same for both slots of successive slot pairs commencing with the pair formed by the end slots of each respective slot group.

The two dimensional planar array 40 shown in FIG. 2 forms a second embodiment of the invention. The planar array 40 comprises a number of square waveguide branch lines 42 and two square waveguide feed lines 44, either or both of which may possess the electrical and mechanical characteristics of the linear array 10 of FIG. 1. The two square waveguide feed lines 44 include coupling slots, such as the crossed slots 45, so that the $TE_{10}$ and $TE_{01}$ modes propagating through the feed lines 44 may be coupled to each of the branch lines 42. Each feed line 44 also includes two orthogonal mode transducers 46, 48 which, in all respects, may be similar to the mode transducers 18, 20 of FIG. 1. This permits the excitation of the two square waveguide modes through two orthogonally oriented rectanguar waveguide input-output ports 50 and 52.

Figure 4:
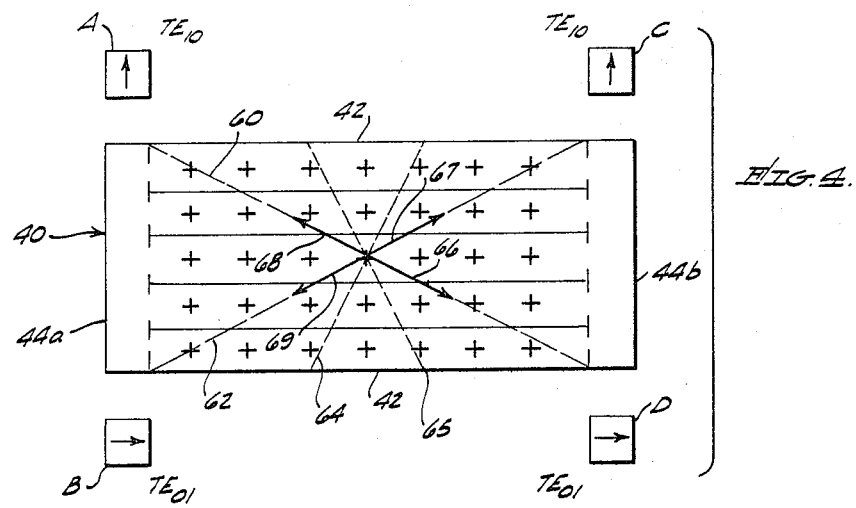
FIG. 4 is a schematic diagram for facilitating the explanation of the embodiment shown in FIG. 2.

The planar array 40 is travelling-wave excited with the signal emanating from each of the ports 50 or 52 giving rise to a single beam in space. The relative phase of the four signals propagating along the branch and feed lines can be adjusted to orient two pairs of symmetrical beams each pair being directed oppositely along, for example, the diagonals 60, 62 of the planar array 40 as seen in FIG. 4. Sidelobe reduction may be accomplished by instituting the appropriate amplitude tapers not only in the square waveguide feed lines 44 which excite each square waveguide branch line 42 but also in the branch lines 42 themselves. Port or signal isolation in the array 40 is again attained from the mode isolation that exists between the two dominant square waveguide TE modes.

In FIG. 4, suppose port A is adjusted to transmit only a $TE_{10}$ signal and to reject all others including the $TE_{01}$ signals. This can be accomplished at port A by using the appropriate rectangular waveguide arm as for example, the port 52a of the orthogonal mode transducer 46, to be responsive to the $TE_{10}$ mode and by absorbing the orthogonal $TE_{01}$ mode in a conventional matched termination, not shown, located in the other rectangular waveguide arm, namely, the port 50a. Similarly port B can be made responsive only to a $TE_{01}$ signal. Thus, substantial mode isolation can be attained between the signals emanating from both of the ports A and B as these signals traverse the waveguide feed line 44a and the branch lines 42.

Consider next the signal isolation between ports A, C and D. Let it be required that the $TE_{10}$ signals from port A generate a beam 66 in space which is oriented along a diagonal 60 toward the lower right-hand corner of the array 40 as seen in FIG. 4. To satisfy this requirement, the waves in the branch lines 42 must travel through the array 40 as a common equiphase front, depicted in FIG. 4 at an arbitrary point as a dotted line 64. Energy not radiated by the array 40 as this equiphase front traverses the aperture constitutes a residual signal which will in turn excite the feed line 44b containing ports C and D. The majority of this residual signal, due to the orientation of the equiphase front, will then be directed toward port D. As such, port D absorbs the $TE_{10}$ signal in a load, not shown, since it normally is responsive only to a $TE_{01}$ signal. Thus, the ports A and D are suitably mode-isolated.

Some of the residual signal, however, may back-scatter through the feed line 44b toward port C and be accepted there since port C is also responsive to $TE_{10}$ signals. The degree of isolation between ports A and C therefore depends firstly upon the efficiency of the feed lines 44a, 44b and the aperture formed by the branch lines 42, i.e., the amount of $TE_{10}$ signal from port A that subsequently is coupled into the feed line 44b and ultimately to the port C, and secondly upon the coupling response of port C to an incoming signal with this prescribed equiphase front and direction.

In summary substantial mode isolation exists on transmit and receive between the port A and the ports B and D. As between the ports A and C adequate isolation may also be obtained depending upon the efficiency of the overall antenna network and the coupling properties of port C.

Similar description likewise apply to the signals emanating from the other three ports with the $TE_{01}$ signal from the port B generating a beam 67 directed toward the upper right-hand corner of the array 40, the $TE_{10}$ signal from the port C generating a beam 69 directed toward the lower left-hand corner of the array 40 and the $TE_{01}$ signal from the port D generating a beam 68 directed toward the upper left-hand corner of the array 40.

Since the $TE_{10}$ mode signals from ports A and C excite only the group of series slots in the branch lines 42, the beams generated are polarized parallel to the axis of the branch lines. Similarly, the $TE_{01}$ mode signals from ports B and D energized only the shunt slots to produce beams with the othogonal polarization. Near broadside pencil beams similar to those generated by the test array mentioned in conjunction with FIG. 1 may also be produced with a two dimensional planar array of the type illustrated in FIGS. 2 and 4. One way to do this is by operating such an array at a frequency near the cut-off frequency of the particular square waveguides used.

As in the linear array 10 of FIG. 1, non-resonant length slots are preferred in the two dimensional planar array 40 of FIGS. 2 and 4 and an even coupling function employed to control the amplitude distribution of the energy radiated by each independent slot group. With this arrangement, the internal signal or port isolation is maintained throughout the array 40.

It should be pointed out that simultaneous operation as used herein means that no external switching devices are necessary to produce the two and four simultaneous beams of the arrays of FIGS. 1, 2 and 4 respectively. However, in certain applications and/or under certain operational conditions, such external switching devices may be required to meet the increased RF information rates desired. In such an event, commercially available microwave switches may be coupled to the orthogonal ports of the arrays 10, 40 of FIGS. 1 and 2 respectively without detrimental effects. Such switches may then be conventionally operated, individually or as a group, in some sequence as, for example, alternatively between two operational conditions, say condition A and condition B. With such an arrangement, the linear array 10 of FIG. 1 can generate four beams in space as shown in FIG. 3 and the two-dimensional planar array 40 of FIG. 2, eight beams in space, reference FIG. 5.

Referring now to FIG. 3, more than one set of image beams can be produced by connecting conventional two positioned microwave switches 70, 72 to each of the two single-mode orthogonal ports 26, 28 of the linear array 10 of FIG. 1. The result is a four-port, four-beam device having suitable external beam and internal signal isolation characteristics. Each of the switches 70, 72 is operatively connected to remotely open a transmit-receive channel and simultaneously close a flat load channel at the proper time.

For example, assume that for condition A the switches 70a and 70b are actuated to open the transmit-receive channels 74a and 74b to the ports 26a and 28b respectively and also that the switches 72a and 72b are actuated to open the channels 76a and 76b to connect the appropriate flat loads L to the ports 28a and 26b respectively. A $TE_{01}$ signal may now be launched from a suitable microwave signal generator (not shown) through the transmit-receive channel 74a and thereafter propagated through the waveguide 12 in the direction of the arrow 75. Energy propagated in this mode will now be coupled to the shunt group of slots and a single off-broadside beam 80a will be generated in a plus $\theta$ direction as shown in FIG. 3. At the same time, a $TE_{10}$ signal similarly launched by this or another microwave signal generator (not shown) through the transmit-receive channel 74b can thereafter be propagated through the waveguide 12 in the direction of the arrow 85. Energy propagated in this the $TE_{10}$ mode will excite the series group of slots and another single off-broadside beam 80b will be generated in a minus $\phi$ direction, also shown in FIG. 3. That energy which is not coupled to the appropriate slot group continues to propagate in the original direction through the waveguide 12, the $TE_{01}$ and the $TE_{10}$ modes respectively passing through the ports 26b and 28a, hence through the corresponding channels 76b and 76a and substantially absorbed by the flat loads L.

By actuating the switches 70 and 72 to the second of their two operable positions, condition B is established. Specifically, the switches 70a and 70b now connect the flat loads L through the corresponding channels 82a and 82b to the ports 26a and 28b respectively, and the switches 72a and 72b connect the associated transmit-receive channels 84a and 84b respectively to the ports 28a and 26b. A $TE_{01}$ signal launched through the transmit-receive channel 84b simultaneously with a $TE_{10}$ signal through the transmit-receive channel 84a will cause two off-broadside pencil beams 80a' and 80b' to be generated, these being mirror image beams respectively of the beams 80a and 80b since an even slot coupling distribution function was employed. Again, the flat loads L receive through the channels 26a and 28b and absorb all that energy of the $TE_{01}$ and $TE_{10}$ modes respectively that is not coupled to the corresponding shunt and series slot groups of the array 10.

It should be noted that during condition B the direction of propagation of each of the dominant orthogonal TE modes is opposite that during condition A. The beam 80a therefore is generated by the $TE_{01}$ mode when it is propagated through the waveguide 12 in the direction of the arrow 75, whereas the beam 80a' is generated by the same mode when it is propagated in the direction of the arrow 85. Similar statements may be formulated for the orthogonally polarized beams 80b and 80b' as generated by the $TE_{10}$ mode. Thus, a first set of simultaneous beams 80a and 80b and a second set of simultaneous beams 80a' and 80b' can be generated by the embodiment shown in FIG. 3 by switching between conditions A and B in any desired manner.

The beam pointing direction for a zero-order beam derived from each linear slot group in the aperture of the waveguide 12 may be calculated from the known expression, $$\sin \theta = \sqrt{1 - \left(\frac{\lambda_0}{2a}\right)^2} \quad (1)$$

where:

"$a$" = the inner dimension of the square waveguide.
$\gamma_0$ = the free space wavelength.
$\theta$ is measured from the normal to the aperture plane.

According to this expression the beams 80a and 80b in FIG. 3 should be at equal and opposite angles from the normal, i.e., $\pm \theta$ should equal $\pm \phi$ respectively, rather than as shown, the primary purpose there being a descriptive one. However, to provide a linear array having the two sets of mirror image beams as shown in FIG. 3 require the square waveguide 12 be changed slightly in cross section to form an appropriate rectangular shape. In that case each orthogonal TE mode would have a different waveguide "$a$" dimension and each would provide different beam pointing directions for the beams radiated from the two independent slot groups. Such an independent beam pointing control does not in any way interfere with the internal signal or port isolations.

Also, the dual mode array 10 of FIG. 3 readily lends itself to the generation of multiple beams whose pattern shape is independent of the polarization transmitted or received by the antenna ports 26 and 28. To obtain this arbitrary polarization feature the beam pointing directions of the beams 80a and 80b must be substantially the same, and the $TE_{01}$ and $TE_{10}$ modes must have the same phase velocity as they propagate through the waveguide transmission line. To obtain isolation between the ports 26 and 28 of FIG. 3, sequential switching would have to be employed so that one port may transmit or receive when the other port is switched to a flat load termination, and vice versa.

In FIG. 3, the beam pointing directions 80 can also be varied according to the above expression by varying the frequency accordingly. For example, in the test array previously described, the main beam as shown in FIG. 6 can be made to scan through an arc extending approximately between 15° and 35° off the aperture normal by varying the frequency respectively between 7.6 kilomegacycles and 8.8 kilomegacycles.

Referring now to FIG. 5, a two dimensional planar array 40a capable of generating two quadruplets of independent beams in space is shown. To the ports 50 and 52 of the array 40a are connected conventional two position microwave switches 90 and 92 respectively. The switches 90 may be actuated to connect a transmit-receive channel 94 to the port 50 when disposed in a first operable position and when in the other position to connect a flat load L to the port 50 through a channel 86. Similarly, the microwave switch 92 connects a transmit-receive channel 96 to the port 52 in one operable position and the flat load L through the channel 88 to the same port 52 when disposed in the other operable position. As in FIG. 2, the ports 50 and 52 are capable of supporting energy propagated therethrough in the $TE_{01}$ mode and the $TE_{10}$ mode respectively. In all other respects the feed lines 44 and the branch lines 42 are similar to those shown and described in conjunction with FIGS. 2 and 4.

In operation, during condition A, the switches 92a and 92c are actuated to open the transmit-receive channels 96a and 96c respectively to the corresponding ports 52a and 52c. The switches 90b and 90d likewise connect the transmit-receive channels 94b and 94d to the feed lines 44 through the corresponding ports 50b and 50d. In addition, the switches 90a and 90c are disposed so that the flat loads L are coupled to the ports 50a and 50c respectively. And finally, the switches 92b and 92d connect the flat loads L to the feed lines 44 through the corresponding ports 52b and 52d.

In this condition, namely condition A, the two dimensional array 40a can generate the beams 66a, 67a, 68a and 69a substantially in the same manner as the beams 66, 67, 68 and 69 described in conjunction with FIG. 4.

In FIG. 5, the other mode of operation, namely condition B, may be established by actuating the switches 90 and 92 to other than the operable positions described under condition A. This is analogous to interchanging the ports B and D with the ports A and C respectively in FIG. 4. Stated differently, the ports A and C of FIG. 4 are now responsive to $TE_{01}$ signals instead of $TE_{10}$ signals, and the ports B and D are similarly responsive to $TE_{10}$ signals instead of $TE_{01}$ signals. In all other respects operation under condition B is similar to operation under condition A except that the plane polarization of a second set of beams (not shown), which may be a mirror image of the first set comprising the beams 66a, 67a, 68a and 69a, generated under condition B are orthogonal to those generated under condition A.

In FIG. 5, the direction of each of the corresponding beams 66a, 67a, 68a and 69a of each of the two sets can be selectively oriented at like angles from a normal to the center of the array 40a by utilizing an even coupling function in both the square waveguide feed lines 44 and the square waveguide branch lines 42. In that event, the arbitrary polarization feature of the linear array of FIG. 3 can also be provided in the two dimensional planar array of FIG. 5 by propagating the $TE_{10}$ and the $TE_{01}$ modes through the array 40a at the same phase velocity.

A second expression similar to Equation 1 relating the beam pointing direction to the free space wavelength $\lambda_0$ and the inner "$a$" dimension for each orthogonal mode is applicable in determining the beam position in space for the beams provided by the arrays 40 and 40a of FIGS. 2 and 5 respectively. This second expression is:

$$\frac{\lambda_0}{\lambda_g} = \sqrt{1 - \left(\frac{\lambda_0}{2a}\right)^2} \quad (2)$$

where in the feed lines 44, $$\sin \theta \cos \phi = \frac{\lambda_0}{\lambda_{gf}} \quad (3)$$

and in the branch lines 42, $$\sin \theta \sin \phi = \frac{\lambda_0}{\lambda_{gb}} \quad (4)$$

where:

$\theta$ = elevation angular coordinate of the far field
$\phi$ = azimuth angular coordinate of the far field
$\lambda_0$ = free space wavelength
$\lambda_{gf}$ = guide wavelength in the feed lines 44
$\lambda_{gb}$ = guide wavelength in the branch lines 42
"$a$" = the inner dimension of the square waveguide of the corresponding feed line or the branch line.

Thus, for a desired beam pointing direction, the "$a$" dimension for example may be adjusted accordingly for the desired frequency of operation or vice versa.

Thus, there has been described a dual mode slot antenna capable of generating two simultaneous independent beams from a single linear array or four such beams from a two dimensional planar array. With sequential switching, an additional set of these beams can be generated. Irrespective of the arrangement chosen, beam scanning can be achieved by varying the frequency of operation accordingly. Finally, each set of beams may selectively have the same or different beam pointing directions, and, if the same, may be arbitrarily polarized by propagating the two orthogonal modes at the same phase velocity through the waveguide network.

With such features, antennas according to the invention are suitable and applicable in the field of countermeasures, and in areas of selective space or ground communication or search as well as space navigation where a more rapid determination and monitoring of the velocity vector of an aerospace vehicle is particularly desired.

While several embodiments of the invention have been shown and described, others may be made without departing from the intended scope of the invention, the purpose here being primarily descriptive and not limiting in any sense.

What is claimed is:

1. A dual mode slot antenna for producing multiple beams in space, comprising, in combination, a substantially square waveguide capable of supporting the propagation of microwave energy in the dominant $TE_{01}$ and $TE_{10}$ modes, said waveguide embracing in a central portion of a wall thereof a linear array of non-resonant spaced apart shunt and series slots operatively responsive to said $TE_{01}$ and $TE_{10}$ modes respectively; orthogonal mode transducer means coupled to said waveguide at the ends thereof and including first and second ports for passing only the dominant $TE_{01}$ and $TE_{10}$ modes respectively; terminal means including a microwave device coupled to said antenna for exciting said dominant modes simultaneously from opposite ends of said waveguide to form two independent beams angularly disposed from the broadside of said wall by an angle $\theta$; and load means coupled to each of said transducer means at different ones of said ports for absorbing substantially all of the microwave energy incident thereat other than that passing through the remaining ports.

2. The dual mode slot antenna according to claim 1 wherein the inner dimensions of adjacent walls of said waveguide are approximately equal so that said two independent beams are directed at different angles from the broadside of said wall.

3. A dual mode slot antenna for producing multiple beams in space comprising, in combination, a substantially square waveguide capable of supporting the propagation of microwave energy in the dominant $TE_{01}$ and $TE_{10}$ modes, said waveguide embracing in the central portion of a wall thereof a linear array of non-resonant spaced apart shunt and series slots each respectively excited by only said $TE_{01}$ and $TE_{10}$ modes; orthogonal mode transducers coupled to said waveguide at the ends thereof and including first and second ports for passing only said dominant $TE_{01}$ and $TE_{10}$ modes respectively; terminal means including a microwave device coupled to said first port of one of said mode transducers and to said second port of the other mode transducer for exciting respectively said $TE_{01}$ and $TE_{10}$ modes simultaneously from opposite ends of said waveguide to form two independent beams disposed at an angle $\theta$ from the broadside of said wall; and load means coupled to the two remaining ports of said mode transducers for absorbing substantially all of the microwave energy other than that radiated through said slots in the direction of said beams.

4. The dual mode slot antenna according to claim 3 wherein the inner dimensions of adjacent walls of said waveguide are approximately equal so that said two independent beams are directed at different angles from the broadside of said wall.

5. The dual mode slot antenna according to claim 3 wherein said series slots are superimposed upon said shunt slots to form crossed slots.

6. The dual mode slot antenna according to claim 5 wherein said shunt slots are longitudinally disposed centered slots and said series slots are symmetrically disposed in said waveguide wall in a plane passing transversely through the center of said centered shunt slots.

7. The dual mode slot antenna according to claim 6 wherein the end slots of said linear array form a slot pair and successive slots from said slot pair form successive slot pairs, both slots of each of said slot pairs being substantially similar geometrically to provide an even coupling function whereby mirror image beams are produced.

8. The dual mode slot antenna according to claim 6 wherein the end slots of said linear array form a slot pair and successive slots from said slot pair form successive slot pairs, each of said slot pairs having substantially the same radiation characteristics.

9. The dual mode slot antenna according to claim 6 wherein the end slots of said linear array form a slot pair and successive slots from said slot pair form successive slot pairs, said slot pairs coacting to form two beams each directed at a predetermined angle on either side of the broadside of said wall.

10. A dual mode slot antenna for simultaneously producing independent mirror image beams in space comprising in combination, a transmission line network capable of supporting the propagation of microwave energy in the dominant $TE_{01}$ and $TE_{10}$ modes, said network including a substantially square waveguide and orthogonal mode transducers connected to the ends of said waveguide, said waveguide embracing in a wall thereof a plurality of non-resonant centered shunt slots and of transversely arranged series slots in the form of crossed slots each spaced apart from the other a predetermined distance so that said shunt slots and said series slots are excited by said dominant $TE_{01}$ and $TE_{10}$ modes respectively, and said mode transducers including first and second ports for passing only the $TE_{01}$ and the $TE_{10}$ modes respectively; switch means coupled to each of said transducers at the ports thereof and including an output port and an input port; load means coupled to said output ports for absorbing substantially all of the microwave energy propagated through said waveguide other than that radiated by said crossed slots; terminal means including a microwave device coupled to said input ports, said device being operatively responsive to the microwave energy passable through the corresponding one of said first and second transducer ports; and control means responsively connected to said switch means for selectively actuating the same to excite said shunt and series slots concomitantly from opposite ends of said waveguide to produce said mirror image beams each disposed from the common broadside of said apertures by an angle $\theta$.

11. The dual mode slot antenna according to claim 10 wherein the inner dimensions of adjacent walls of said waveguide are approximately equal and wherein two sets of mirror image beams are produced, each set being angularly displaced from the broadside of said waveguide wall by angles $\theta$ and $\phi$.

12. A dual mode slot antenna for producing multiple beams in space comprising, in combination, a plurality of parallelly arranged substantially square waveguides each having a wall disposed in a common plane and forming an aperture, said walls each including a first group of centered non-resonant longitudinal slots and a second group of non-resonant transverse slots, respectively excited by microwave energy propagated through said antenna in the dominant $TE_{01}$ and $TE_{10}$ modes; feedline means including substantially square waveguides electromagnetically coupled to said aperture at opposite ends thereof to provide a path through which said modes may propagate; and transducer means connected at each end of said feedline waveguides and including two orthogonal ports, separate ones of said ports being adapted to pass different ones of said dominant modes.

13. A dual mode slot antenna capable of simultaneously producing independent beams in space comprising, in combination, a plurality of parallelly arranged substantially square waveguides each having a wall thereof disposed in a common plane and forming a planar aperture, said walls each including a linear array of spaced apart non-resonant crossed slots comprising a shunt arm and a series arm respectively excited by microwave energy propagating through said antenna in the dominant $TE_{01}$ and $TE_{10}$ modes; feedline means comprising substantially square waveguides capable of supporting the propagation of said modes and including means for coupling said modes to each waveguide of said plurality; transducer means connected at each end of said feedline waveguides and including orthogonal ports, one of said ports passing the propagated energy in the $TE_{01}$ mode and the other port in the $TE_{10}$ mode; switch means coupled to said transducer means at the ports thereof and including a load port and a feed port; load means coupled to each of said load ports for absorbing substantially all of the energy other than that radiated through said slots; terminal means including a microwave device coupled to said feed ports, said device being operatively responsive to the microwave energy passable through the orthogonal ports of said transducer means; and control means responsively connected to said switch means for selectively actuating the same to excite said shunt and series slots concomitantly from said feedline means to produce said independent beams in space at a predetermined angle from the broadside of said planar aperture.

14. The dual mode slot antenna according to claim 13 wherein the inner dimensions of adjacent walls of the waveguides forming said aperture are approximately equal whereby two sets of simultaneous independent beams are produced each set at a different angle relative to the broadside of said aperture.

15. A dual mode slot antenna capable of simultaneously producing independent beams in space comprising, in combination, a plurality of parallelly arranged substantially square waveguides each having a wall thereof disposed in a common plane and forming a planar aperture, said walls each including a linear array of spaced apart non-resonant crossed slots comprising a shunt arm and a series arm respectively excited by microwave energy propagating through said antenna in the dominant $TE_{01}$ and $TE_{10}$ modes, feedline means comprising substantially square waveguides capable of supporting the propagation of said modes and including means for coupling said modes to each waveguide of said plurality; and transducer means connected at each end of said feedline waveguides and including orthogonal ports, one of said ports passing the propagated energy in the $TE_{01}$ mode and the other port in the $TE_{10}$ mode.

16. A dual mode slot antenna capable of simultaneously producing independent beams in space comprising, in combination, branchline means capable of supporting the propagation of microwave energy in the dominant $TE_{01}$ and $TE_{10}$ modes and including a plurality of parallelly arranged substantially square waveguides each with a wall thereof disposed in a common plane to form a planar aperture, said walls each including a linear array of spaced apart non-resonant crossed slots comprising a shunt arm and a series arm respectively excited by said dominant $TE_{01}$ and $TE_{10}$ modes; feedline means comprising two substantially square waveguides capable of supporting said modes and including means for coupling said modes in predetermined phase relationship to said branchline waveguides at the ends thereof; transducer means connected at each end of said feedline waveguides and including orthogonal ports, one of said ports adapted to pass the $TE_{01}$ mode only and the other port the $TE_{10}$ mode only; switch means coupled to said orthogonal ports and provided with a load port and a feed port; load means coupled to each of said load ports for absorbing substantially all of the energy other than that coupled to said slots; terminal means including a microwave device coupled to said feed ports and adapted to respond operatively to the microwave energy transferred therethrough; and control means responsively connected to said switch means for selectively actuating the same to excite said slots from said feedline waveguides concomitantly to produce four independent beams simultaneously each at a predetermined angle from the broadside of said aperture.

17. The dual mode slot antenna according to claim 16 wherein the inner dimensions of adjacent walls of said branchline waveguides are approximately equal whereby two sets of four independent beams are formed, each set at a different angle relative to the broadside of said aperture.

References Cited by the Examiner
UNITED STATES PATENTS

| | | | |
|---|---|---|---|
| 2,967,301 | 1/1961 | Rearwin | 343—771 |
| 2,982,960 | 4/1961 | Shanks | 343—770 X |
| 3,162,828 | 12/1964 | Schmidt et al. | 333—21 X |

HERMAN KARL SAALBACH, *Primary Examiner.*

P. L. GENSLER, *Assistant Examiner.*